United States Patent
Haarer et al.

(10) Patent No.: US 7,258,136 B2
(45) Date of Patent: Aug. 21, 2007

(54) PRESSURE REGULATOR

(75) Inventors: Werner Haarer, Illingen (DE); Hans-Joerg Fees, Bietigheim-Bissingen (DE); Andreas Peetz, Ludwigsburg (DE); Ralph Ittlinger, Weissach (DE)

(73) Assignee: Robert Bosch GmbH, Stuttgart (DE)

( * ) Notice: Subject to any disclaimer, the term of this patent is extended or adjusted under 35 U.S.C. 154(b) by 188 days.

(21) Appl. No.: 10/546,792

(22) PCT Filed: Jan. 26, 2004

(86) PCT No.: PCT/DE2004/000110

§ 371 (c)(1),
(2), (4) Date: Aug. 24, 2005

(87) PCT Pub. No.: WO2004/079184

PCT Pub. Date: Sep. 16, 2004

(65) Prior Publication Data

US 2006/0196554 A1    Sep. 7, 2006

(30) Foreign Application Priority Data

Mar. 3, 2003 (DE) ............................. 103 09 351

(51) Int. Cl.
*F16K 15/04* (2006.01)
*G05D 16/02* (2006.01)
*F02M 69/54* (2006.01)

(52) U.S. Cl. .................. 137/539; 137/535; 251/337
(58) Field of Classification Search ................ 137/535, 137/539, 539.5; 123/506, 510; 251/337

See application file for complete search history.

(56) References Cited

U.S. PATENT DOCUMENTS

| 1,922,379 | A | * | 8/1933 | Longfellow | 137/539 |
|---|---|---|---|---|---|
| 3,768,102 | A | * | 10/1973 | Kwan-Gett et al. | 137/539 |
| 4,387,715 | A | * | 6/1983 | Hakim et al. | 604/9 |
| 5,564,397 | A | * | 10/1996 | Kleppner et al. | 123/514 |
| 5,655,503 | A | * | 8/1997 | Kampichler et al. | 123/510 |
| 5,775,894 | A | * | 7/1998 | Kosco, Jr. | 137/539 |
| 6,681,798 | B2 | | 1/2004 | Bueser et al. | |
| 6,802,791 | B1 | * | 10/2004 | Yoshioka | 137/539 |
| 2004/0149338 | A1 | | 8/2004 | Wheeler et al. | |
| 2005/0005973 | A1 | | 1/2005 | Haarer et al. | |

FOREIGN PATENT DOCUMENTS

| DE | 101 07 223 A1 | 8/2002 |
|---|---|---|
| EP | 1 239 145 A2 | 9/2002 |
| WO | WO 03/067077 A1 | 8/2003 |
| WO | WO 03/102408 A1 | 12/2003 |

* cited by examiner

*Primary Examiner*—John Rivell
(74) *Attorney, Agent, or Firm*—Ronald E. Greigg

(57) ABSTRACT

A pressure regulator for regulating fuel pressure in an internal combustion engine, containing a valve including a closing member forced into a valve seat by the action of an angularly shaped valve leaf spring one arm of which is braced on the closing member and the other arm is braced on a support member of a regulator housing. In the region of its angled portion, the leaf spring is fixed on a pin supported in the regulator housing, and the bearing of the pin in the regulator housing contains side walls of the regulator housing that wrap around bearing bores in the valve leaf spring with parallel spacing and that extend substantially perpendicular to the pin. The side walls are overlapped at least in part by tabs that are connected to the support member of the regulator housing and are provided with bearing bores for the pin which are coaxial relative to the bearing bores in the side walls.

20 Claims, 1 Drawing Sheet

PRESSURE REGULATOR

CROSS-REFERENCE TO RELATED APPLICATIONS

This application is a 35 USC 371 application of PCT/DE 04/00110 filed on Jan. 26, 2004.

BACKGROUND OF THE INVENTION

1. Field of the Invention

This invention is directed to an improved pressure regulator, and more particularly to an improved fuel pressure regulator for an internal combustion engine.

2. Description of the Prior Art

Pressure regulators for a fuel supply system of an internal combustion engine are known which contain a valve that includes a valve closing member that is forced into the closing position against a valve seat by the action of an angularly shaped valve leaf spring, and one arm of the valve leaf spring is braced on the valve closing member and the other arm is braced on a support member of a regulator housing, and in the region of its angled portion, the valve leaf spring is fixed on a pin supported in the regulator housing, and the bearing of the pin in the regulator housing contains side walls of the regulator housing that wrap around bearing bores in the valve leaf spring with parallel spacing and that extend substantially perpendicular to the pin.

One such pressure regulator is described in German Patent Disclosure DE 101 07 223 A1; the valve leaf spring is pivotably supported by the pin in such a way that there is a torque equilibrium at the valve leaf spring. The valve leaf spring braced on the support member of the regulator housing is prestressed, and the prestressing force acts as a closing force on the valve closing member. The pin acts here as a bearing point, which transmits the forces acting on the valve leaf spring to the regulator housing. If at a pressure inlet of the pressure regulator fuel pressure prevails that is high enough to generate a pressure force greater than the closing force acting on the valve ball, then the valve closing member lifts away from the valve seat and uncovers a defined flow cross section, so that fluid, in particular fuel, can flow to a pressure outlet of the pressure regulator.

SUMMARY AND ADVANTAGES OF THE INVENTION

The overlapping of the tabs of the support member with the side walls produces a reinforcement of the regulator housing, without requiring that its wall thickness be increased. In particular, by the tabs and the pin, the support member of the regulator housing, loaded by the valve leaf spring with a bending moment, is bound to the side walls and as a result reinforced in the loading direction. The side walls together with the tabs with the support member then form a reinforcing triangle. The pin, which is actually provided for holding the valve leaf spring or deflecting the leaf spring forces, in a further function now also forms a form-locking and force-transmitting connection between the tabs of the support member and the side walls, without the tabs of the support member and the side walls having to be additionally joined to one another, for instance by welding or riveting, which would also lead to higher production costs.

Overall, a very rigid, dimensionally stable bearing of the pin relative to the valve closing member is consequently attained, which advantageously increases the reliability and functional safety of the pressure regulator. For instance, if instead of the provisions of the invention, beads were provided for reinforcement in the region of the support member or of the side walls, this would involve deformations of material, which would make exact positioning of the pin relative to the valve closing member difficult.

In a preferred embodiment of the invention, the tabs of the support member contact the side walls and overlap them from the outside or from the inside. In addition, the support member is formed for instance by a transverse wall or back wall of the regulator housing, and the tabs are embodied integrally with this transverse wall and are bent at a right angle from it. Moreover, the side walls of the regulator housing are preferably formed by two further tabs, bent from a bottom plate and cantilevered. The regulator housing can then be embodied as a one-piece, easily made stamped and bent part, in which after the stamping of a flat shaped part, the bores are made, and then all that has to be done is to bend the four tabs at a right angle.

In a refinement of this embodiment, the tabs forming the side walls of the regulator housing and/or the tabs of the transverse wall form a guide conduit for the valve leaf spring. As a result of this provision, rigid guidance of the valve leaf spring is possible, which has a favorable effect on the reliability and functional safety of the pressure regulator.

Also for the sake of rigid, reliable bearing of the valve leaf spring, in addition the transverse wall, on its end, is bent toward the valve leaf spring and engages a groovelike bend of the valve leaf spring.

Especially preferably, the valve closing member is formed by a valve ball located between the valve seat and the one arm of the valve leaf spring, and a damping ring is located between the valve ball and the one arm of the valve leaf spring. This damping ring may be embodied by a plastic ring of circular cross section, and it assures damping of the vibrations of the valve ball that occur during operation, which enhances the functional safety of the pressure regulator and reduces noise. In particular, the damping ring may comprise a plastic blank, produced by cutting machining or by injection molding. In both cases, the production and installation of the damping ring are extremely simple, since the damping rings are simple circular components that are merely inserted between the valve leaf spring and the valve ball, without requiring that the valve leaf spring or the valve ball be modified for the purpose.

BRIEF DESCRIPTION OF THE DRAWINGS

One exemplary embodiment of the invention is described in further detail herein below, with reference to the drawings, in which.

DESCRIPTION OF THE PREFERRED EMBODIMENT

Figure 1:
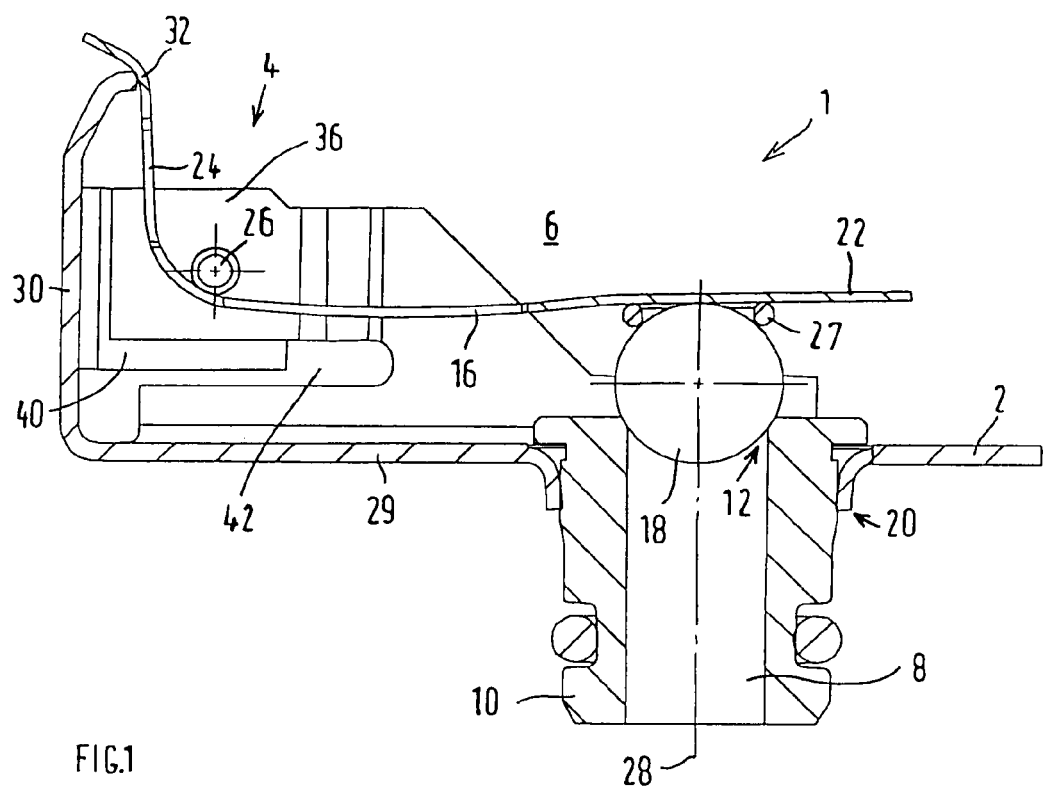
FIG. 1 is a cross-sectional view of a preferred embodiment of a pressure regulator according to the invention.

The pressure regulator, identified overall in FIG. 1 by reference numeral 1 and shown there in a closing position, is installed, in a preferred embodiment, on a built-in tank unit or filter unit of a motor vehicle, neither of them shown for reasons of scale, and serves to regulate the fuel pressure in the fuel system of a self-igniting internal combustion engine.

The pressure regulator 1 has an open regulator housing 2 of L-shaped cross section, onto which a hood, not shown for the sake of simplicity, is placed, in which hood a pressure outlet 4, indicated only by an arrow, is embodied that connects an interior 6 of the regulator housing 2 with the fuel tank. Protruding into the regulator housing 2 at the bottom is a connection piece 10, which forms a pressure inlet 8 and is connected to a pressure line, not shown, of the fuel system. The regulator housing 2 is preferably a one-piece stamped and bent part, into which the connection piece 10 is inserted. Alternatively, the regulator housing 2 could be made as an injection-molded part.

On one end of the connection piece 10, there is a valve seat 12, with a conical face for centering a valve ball 18. Instead of being embodied directly on the connection piece 10, the valve seat 12 may also be embodied on the regulator housing 2; in that case, the regulator housing 2 and the valve seat 12 are embodied for instance as a one-piece injection-molded part machined in a cutting way. The cone angle of the conical face is 60°, for instance. The valve ball 18 is forced against the valve seat 12 by the action of a valve leaf spring 16. The valve leaf spring 16, valve ball 18, and valve seat 12 together form an overflow valve 20 of the pressure regulator 1. The valve ball 18 may be of steel, ceramic, or plastic; its diameter is preferably from 3 mm to 12 mm.

The valve leaf spring 16 preferably has an angular shape, comprising two arms 22, 24 extending substantially at right angles to one another, and is pivotable about a pivot axis, in the form of a pin 26, that is supported in the regulator housing 2 and is located transversely to the length of the valve leaf spring 16 and perpendicular to a plane that includes the center axis 28 of the valve seat 12. The pin 26 fits over the valve leaf spring 16 and extends approximately in the region of the angled portion of the valve leaf spring 16, that is, in the region of an imaginary line of abutment of the two arms 22, 24 of the valve leaf spring 16. The total length of the coiled valve leaf spring is for instance 10 to 40 mm, and its width is approximately 5 mm to 20 mm. The spacing of the center axis 28 of the valve seat 12 from the pin 26 is preferably 8 mm to 35 mm.

Between the arm 22 of the valve leaf spring 16 on the side toward the valve seat, which arm extends preferably perpendicular to the center axis 28 of the valve seat 12, and the valve ball 18 that with its apex contacts the valve leaf spring 16, there is a damping ring 27. More precisely, with a spherical segment of its hemisphere that points toward the valve leaf spring 16, the valve ball 18 protrudes into an annular opening in the damping ring 27 and thereby holds it at the valve leaf spring 16. The damping ring 27 preferably has a circular cross section and is made of a plastic. In particular, the damping ring 27 may be formed by a plastic blank produced by cutting machining or by injection molding, whose inner wall, pointing toward the valve ball 18, is for instance provided with a chamfer or has a seat face in the form of a spherical layer that is embodied in complementary form to the valve ball 18. Instead of being made of plastic, the damping ring 27 may also be made from some other material, such as steel or an elastomer. What is decisive is that in operation, frictional forces develop between the damping ring 27, the valve leaf spring 16 and the valve ball 18, that on the one hand are strong enough to damp vibrational motions of the valve ball 18, yet on the other are not so strong that centering of the valve ball 18 in the valve seat 12 when the overflow valve 20 closes is hindered.

By the bracing of the arm 24 of the valve leaf spring 16 on a support member in the form of a transverse wall 30 that protrudes vertically upward from a bottom plate 29 of the regulator housing 2, and by the bracing of the other arm 22 on the valve ball 18 and the fit of the pin 26 over the valve leaf spring 16 in the region of its bend, a prestressing force is engendered in the valve leaf spring 16, which generates a force on the arm 22 toward the valve seat that forces the valve ball 18 against the valve seat 12. Another decisive factor is the position of the pin 26, which fixes the valve leaf spring 16 counter to the supporting forces of the transverse wall 30 and the valve ball 18. Moreover, the magnitude of the closing force, exerted as a reaction to the prestressing of the valve leaf spring 16 at the top on the valve ball 18, is due to the lever ratios chosen for the two arms 22, 24. A torque equilibrium then prevails at the valve leaf spring 16.

To attain stable bracing of the arm 24 of the valve leaf spring 16 and to introduce the bracing force substantially perpendicularly into the arm 24 of the valve leaf spring 16, the transverse wall 30 is bent, for instance on its end, toward the valve leaf spring 16 and engages a groovelike bend 32, likewise at the end and extending transversely, of the arm 24 of the valve leaf spring 16. Since the regulator housing 2 is a one-piece component, the transverse wall 30 is also in one piece with the bottom plate 29.

Figure 2:
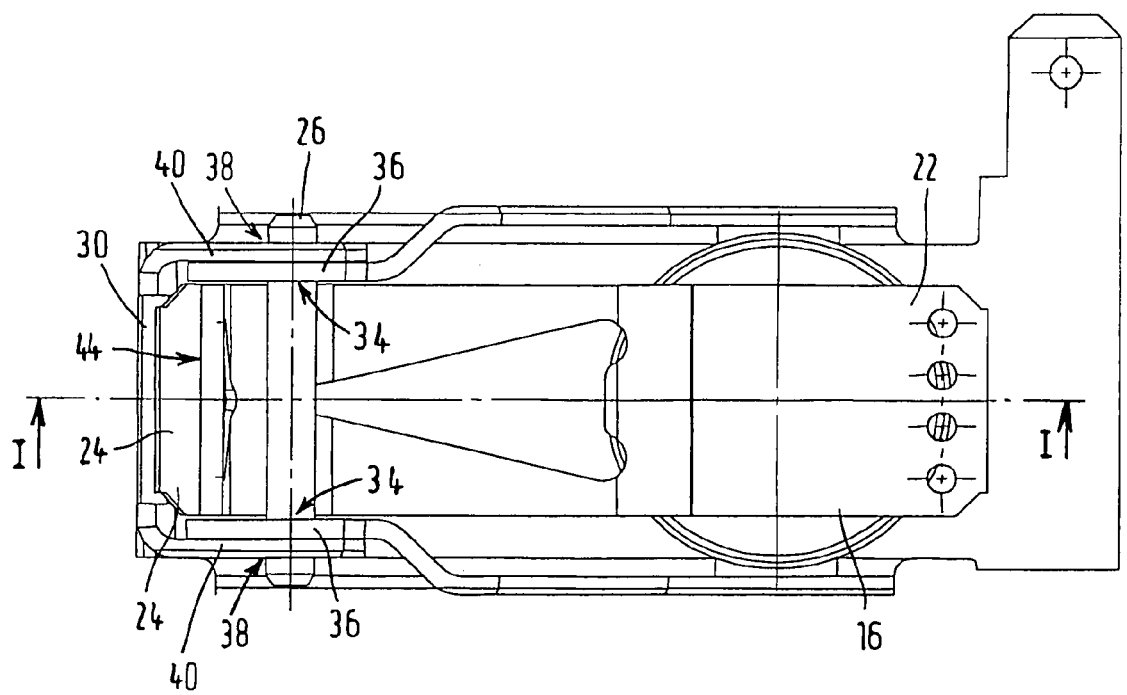
FIG. 2 is a plan view on the pressure regulator of FIG. 1.

The bearing of the pin 26 in the regulator housing 2 is effected on the one hand by side walls 36 of the regulator housing 2 which wrap around bores 34, best seen in FIG. 2, into the valve leaf spring 16 with parallel spacing and extend substantially perpendicular to the pin 26, and on the other hand by tabs 40, overlapping bores 38, coaxial to them, into these side walls 36 and preferably in contact from outside and connected to the transverse wall 30 of the regulator housing 2. These tabs 40 are preferably embodied in one piece with the transverse wall 30 and thus with the regulator housing 2 and are bent at a right angle from the transverse wall 30. Instead of the side walls 36 being overlapped by the tabs 40 of the transverse wall 30 from the outside, the tabs 40 could also contact the side walls 36 from the inside in an overlapping fashion; that is, the tabs 40 are located inside the side walls 36 and embraced by them from outside.

The side walls of the regulator housing 2 are preferably likewise formed by two further tabs 36, cantilevered from the bottom plate 29 and bent at an angle, as best shown by FIG. 1. There is a horizontal gap 42 between the bottom plate 29 and a portion of these tabs 36 pointing toward the transverse wall 30, to make it possible to bend these tabs 36 at a right angle to one another in such a way that they form a guide conduit 44 for the valve leaf spring 16 (FIG. 2). More precisely, at least in the region of where they are bent, the tabs 36 surround the valve leaf spring 16 with little play. The overlapping of the tabs 36, 40 is preferably effected in the region of the right-angle bend of the tabs 36. The tabs 36 functioning as side walls are moreover provided with the bores 34 for the pin 26. For the aforementioned alternative in which the tabs 40 of the transverse wall 30 are located on the inside and tabs 36 of the side walls are located on the outside, the valve leaf spring 16 is guided directly by the tabs 40 of the transverse wall 30, which then form the guide conduit 44 between them. It is furthermore conceivable for the guide conduit 44 to be formed by both the tabs 40 and the tabs 36, in that on each side tabs 36, 40, in portions in terms of the length of the guide conduit 44, take on the guidance function.

The transverse forces acting on the transverse wall 30 because of the tension of the valve leaf spring 16 are consequently transmitted, via the tabs 40 and by means of the pin 26, to the tabs 36 functioning as side walls and from there are introduced into the bottom plate 29. In particular, the transverse forces occurring as a result of the bracing of the valve leaf spring 16 on the cantilevered transverse wall 30, are transmitted as tensile forces on the tabs 36 functioning as side walls. The pin 26, as a transmission member, creates a form-locking connection between the tabs 40 of the transverse wall 30 and the tabs 36 functioning as side walls, without requiring that the tabs 36, 40 moreover be joined to one another.

Against this background, the mode of operation of the pressure regulator 1 is as follows: When fuel pressure prevails at the pressure inlet 8 that is high enough to generate a pressure force that is greater than the closing force acting on the valve ball 18, the valve ball 18 lifts from the valve seat 12 and uncovers a defined flow cross section, so that fuel can flow into the interior 6 of the regulator housing 2 and from there to the pressure outlet 4. Because of the elastic properties of the valve leaf spring 16, the flow cross section enlarges as the fuel volume becomes greater, but the pressure difference between the pressure inlet 8 and the pressure outlet conversely increases only slightly and approximately linearly.

The invention is not limited, however, to a pressure regulator of this kind. On the contrary, the pressure regulator of the invention may also be a pressure regulator in which the magnitude of the outlet pressure differs from the magnitude of the inlet pressure and can be adjusted.

The foregoing relates to preferred exemplary embodiments of the invention, it being understood that other variants and embodiments thereof are possible within the spirit and scope of the invention, the latter being defined by the appended claims.

The invention claimed is:

1. In a pressure regulator for a fuel supply system of an internal combustion engine, for regulating a fluid pressure, the pressure regulator containing a valve which includes a valve closing member (18) that is forced into the closing position against a valve seat (12) by the action of an angularly shaped valve leaf spring (16) having two elongated arms (22, 24), one arm (22) of the valve leaf spring (16) being braced on the valve closing member (18) and the other arm (24) being braced on a support member (30) of a regulator housing (2), and in the region of its angled portion, the valve leaf spring (16) is fixed on a pin (26) supported in the regulator housing (2), and the support for the pin (26) in the regulator housing (2) includes side walls (36) of the regulator housing (2) that wrap around bearing bores (34) with parallel spacing and that extend substantially perpendicular to the pin (26), the improvement wherein the side walls (36) are overlapped at least in part by tabs (40) that are connected to the support member (30) of the regulator housing (2) and are provided with bearing bores (38) for the pin (26) which are coaxial relative to the bearing bores (34) in the side walls (36).

2. The pressure regulator according to claim 1, wherein the tabs (40) of the support member (30) contact the side walls (36) and overlap them from the outside or from the inside.

3. The pressure regulator according to claim 1, wherein the support member is formed by a transverse wall (30) or back wall of the regulator housing (2).

4. The pressure regulator according to claim 2, wherein the support member is formed by a transverse wall (30) or back wall of the regulator housing (2).

5. The pressure regulator according to claim 3, wherein the tabs (40) are embodied integrally with the transverse wall (30) and are bent at a right angle from it.

6. The pressure regulator according to claim 4, wherein the tabs (40) are embodied integrally with the transverse wall (30) and are bent at a right angle from it.

7. The pressure regulator according to claim 5, wherein the side walls of the regulator housing (2) are formed by two further tabs (36), bent from a bottom plate (29) and cantilevered.

8. The pressure regulator according to claim 6, wherein the side walls of the regulator housing (2) are formed by two further tabs (36), bent from a bottom plate (29) and cantilevered.

9. The pressure regulator according to claim 5, wherein the side walls of the regulator housing (2) are formed by two further tabs (36), bent from a bottom plate (29) and cantilevered, and wherein the regulator housing (2) is formed by a one-piece stamped and bent part.

10. The pressure regulator according to claim 6, wherein the side walls of the regulator housing (2) are formed by two further tabs (36), bent from a bottom plate (29) and cantilevered, and wherein the regulator housing (2) is formed by a one-piece stamped and bent part.

11. The pressure regulator according to claim 7, wherein the tabs (36) formed the side walls of the regulator housing (2) and/or the tabs (40) of the transverse wall (30) form a guide conduit (44) for the valve leaf spring (16).

12. The pressure regulator according to claim 8, wherein the tabs (36) formed the side walls of the regulator housing (2) and/or the tabs (40) of the transverse wall (30) form a guide conduit (44) for the valve leaf spring (16).

13. The pressure regulator according to claim 9, wherein the tabs (36) formed the side walls of the regulator housing (2) and/or the tabs (40) of the transverse wall (30) form a guide conduit (44) for the valve leaf spring (16).

14. The pressure regulator according to claim 10, wherein the tabs (36) formed the side walls of the regulator housing (2) and/or the tabs (40) of the transverse wall (30) form a guide conduit (44) for the valve leaf spring (16).

15. The pressure regulator according to claim 3, wherein the transverse wall (30), on its end, is bent toward the valve leaf spring (16) and engages a groovelike bend (32) of the valve leaf spring (16).

16. The pressure regulator according to claim 5, wherein the transverse wall (30), on its end, is bent toward the valve leaf spring (16) and engages a groovelike bend (32) of the valve leaf spring (16).

17. The pressure regulator according to claim 7, wherein the transverse wall (30), on its end, is bent toward the valve leaf spring (16) and engages a groovelike bend (32) of the valve leaf spring (16).

18. The pressure regulator according to claim 9, wherein the transverse wall (30), on its end, is bent toward the valve leaf spring (16) and engages a groovelike bend (32) of the valve leaf spring (16).

19. The pressure regulator according to claim 1, wherein the valve closing member is formed by a valve ball (18) located between the valve seat (12) and the one arm (22) of the valve leaf spring (16).

20. The pressure regulator according to claim 9, wherein a damping ring (27) is located between the valve ball (18) and the one arm (22) of the valve leaf spring (16).

* * * * *